Nov. 4, 1930.   P. L. TENNEY   1,780,370
WHEEL ASSEMBLY
Filed July 2, 1924   2 Sheets-Sheet 1
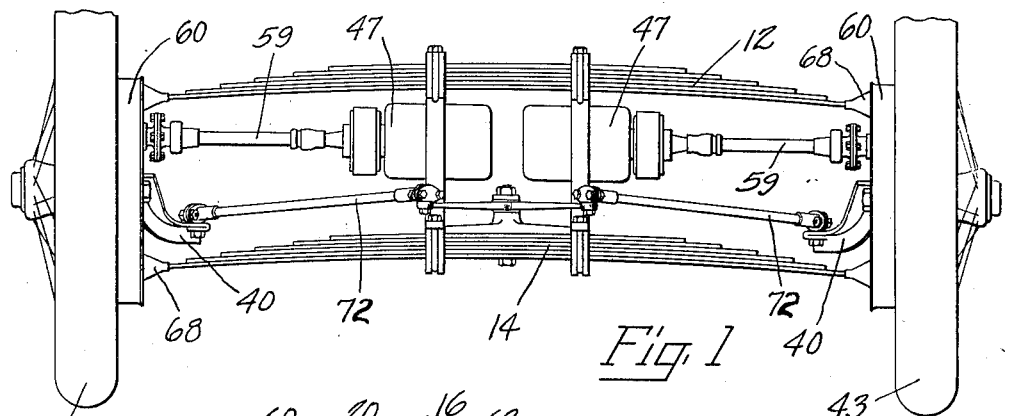
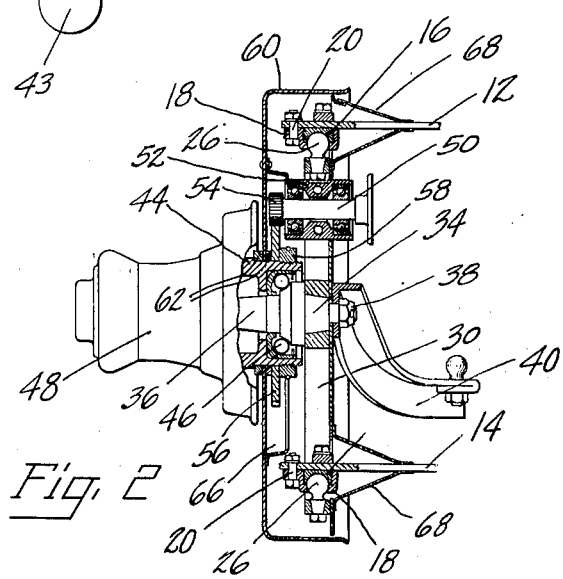
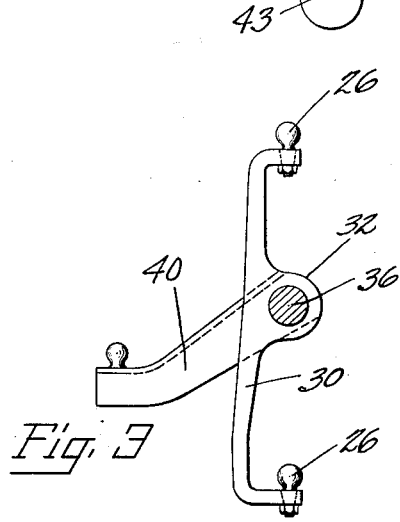
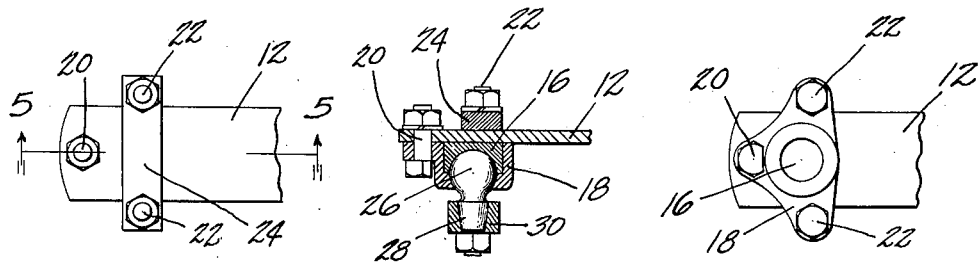
INVENTOR
Perry L. Tenney
BY
Blackmore, Spencer & Flint
ATTORNEYS INVENTOR
Perry L. Tenney
BY
Blackmore, Spencer & Flint
ATTORNEYS Patented Nov. 4, 1930

1,780,370

UNITED STATES PATENT OFFICE

PERRY L. TENNEY, OF MUNCIE, INDIANA

WHEEL ASSEMBLY

Application filed July 2, 1924. Serial No. 723,717.

This invention relates to vehicles, and is illustrated as embodied in an assembly of parts of a vehicle including supporting springs and dirigible wheels carried by knuckles swiveled directly thereto, thus eliminating the usual axle. In one desirable arrangement a pair of vertically spaced springs are swiveled to the upper and lower arms of the knuckle, preferably by novel ball-and-socket joints, and if desired the springs may be of semi-elliptic form extending across the vehicle with one of the knuckles at each end. Other features of the invention relate to a novel knuckle construction which may advantageously be used in such an assembly, to details of the wheel and its mounting, and to a novel steering mechanism.

These various features of the invention will be apparent from the following description of the illustrative embodiments shown in the accompanying drawings, in which:

Figure 1 is a front elevation of two of the springs and of the front wheels;

Figure 2 is a front elevation, partly broken away in vertical section, of part of one wheel and associated parts of the general assembly;

Figure 3 is a side elevation of the knuckle;

Figure 4 is a top plan view of one end of one of the springs, showing the manner of attaching the socket thereto;

Figure 5 is a section on the line 5—5 of Figure 4, but showing also the ball in the socket;

Figure 6 is a bottom plan view of the parts shown in Figure 4;

Figure 7:
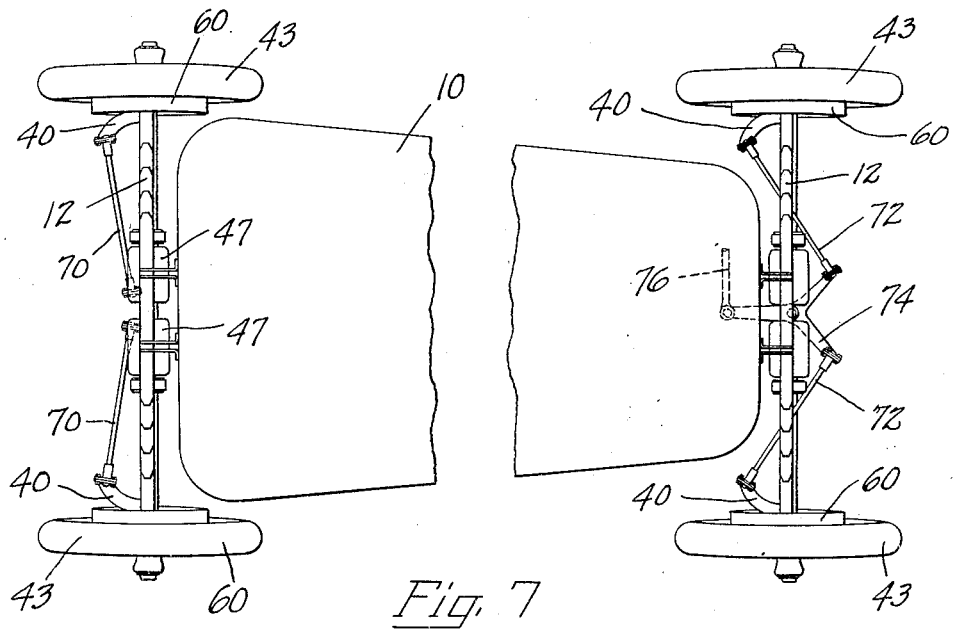
Figure 7 is a diagrammatic top plan view of one form of electrically-propelled vehicle embodying the wheel assembly, and showing part of the steering mechanism.

In the first illustrated arrangement, the body or chassis frame, indicated diagrammatically at 10, is secured at front and rear to pairs of parallel vertically-spaced semi-elliptic springs 12 and 14. At each end of each spring is a socket including a recessed block 16 and a retainer 18 secured to the spring by a bolt 20 and a pair of bolts 22 engaging a clamp plate 24. The head of bolt 20 is shown with a flat side engaging part of the retainer 18 to prevent the bolt from turning.

In each of the sockets so formed is a ball 26 having a conical shank 28 clamped in a horizontally offset upper or lower end of a vertical portion of a dirigible wheel knuckle 30. Each knuckle also has a central offset portion 32 formed with a socket for the conical shank 34 of a wheel spindle 36, the spindle being clamped in place by a nut 38 which also holds a piece 40 of angle iron forming a steering arm and having the usual ball 42 for ball-and-socket connection with a drag link connecting the two knuckles for simultaneous swiveling movement.

Journaled on each spindle is a wheel of any desired form. For purposes of illustration, I have shown wire wheels 43 having inner hubs 44, with bearings 46, together with demountable outer hubs 48 of the usual construction. The particular wheel assembly illustrated is intended for use with an electric motor, or electric motors 47, on the frame or body 10 and arranged to drive the wheels by suitable flexible connections operating short shafts 50 supported by bearings 52 clamped or otherwise secured to the upper arms of the knuckles 30. Each shaft 50 has a pinion 54 driving a gear 56 secured to the hub 44 by a threaded ring 58. The flexible connections include telescopic propeller shafts 59 universally jointed to the armature shafts of motors 47 and to shafts 50.

The moving parts described above are preferably enclosed by a housing including a drum 60 secured to hub 44 by being clamped between two washers 62 held against a shoulder on the hub by gear 56 and its ring 58, and a plate 64 clamped between part 32 of the knuckle and steering arm 40. If desired, a stamping 66 may be secured to drum 60 to catch oil from the gears. The ends of spring 12 and 14 extend through relatively large openings in plate 64, to allow for the flexing of the springs, which openings may be closed by flexible boots 68 shown in Figures 1 and 2 but omitted in Figure 7.

While the above-described arrangement is well adapted for four-wheel drive and four wheel steering, I prefer to have only the rear wheels driven and the front wheels swiveled in steering, as shown in Figure 7. Radius rods 70 from arms 40 prevent swiveling movement of the rear wheels. Drag links 72 connect the arms 40 of the front wheels to two arms of a three arm lever 74 supported on the frame or body 10, the third arm of the lever being connected by a link 76 to steering mechanism of any desired form (not shown).

Figures 8, 9:
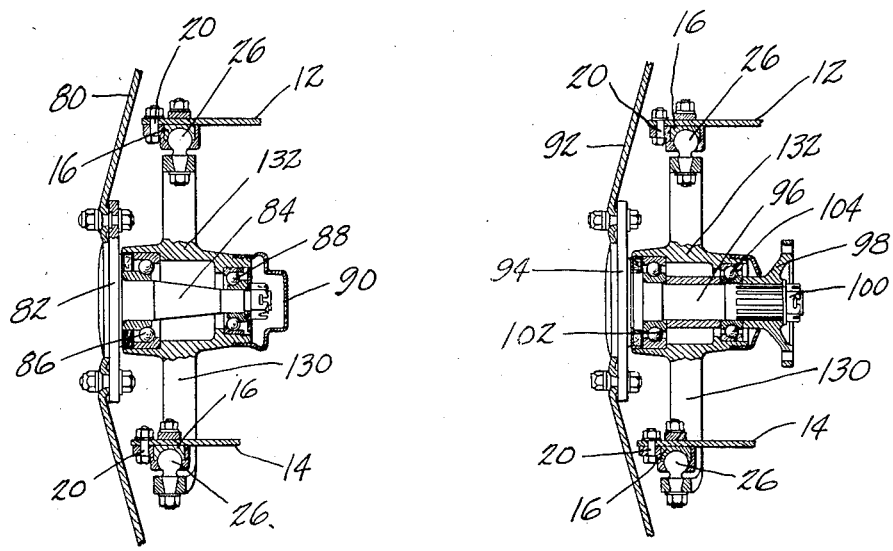
Figure 8 is a vertical section through part of a front wheel suitable for a gasoline-driven vehicle.
Figure 9 is a similar section of the corresponding rear wheel.

In Figures 8 and 9 are shown respectively front and rear wheels for a gasoline-driven vehicle, disk wheels being shown. In this type of vehicle, the rear wheels are driven from the engine through a differential mechanism which is of well-known construction and which is therefore not shown. In Figure 8 the front disk wheel 80 is secured to a flange 82 of a conical spindle 84 held by two bearings 86 and 88 in a hub 132 of a knuckle 130. The hub may be closed by a cap 90 on its inner end. In Figure 9 the rear disk wheel 92 is secured to a flange 94 of a cylindrical spindle 96 having splined thereto a driving member 98 held by a nut 100. The spindle is supported by bearings 102 and 104 in a hub 132 of a knuckle 130 which is preferably interchangeable with the knuckle shown in Figure 8. Driving members 98 may be connected to the differential in any desired manner, as by telescopic universally-jointed propeller or drive shafts.

While illustrative embodiments of my invention have been described in detail, it is not my intention to limit its scope to those particular embodiments, or otherwise than by the terms of the appended claims.

I claim:

1. A wheel assembly comprising, in combination, a pair of vertically-spaced springs, a knuckle having a spindle and a vertical part swiveled directly to the springs, a wheel journaled on the spindle, drive mechanism including intermeshing gears on the wheel and knuckle, and a housing for said gears including cooperating members mounted respectively on the wheel and on the knuckle.

2. A vehicle comprising, in combination, a body or frame, springs supporting the body or frame, four wheels swiveled directly on the springs so as to permit relative rotation of the wheels and springs in both vertical and horizontal planes, radius rods holding two wheels from swiveling movement in a horizontal plane, and steering means for swiveling the other two wheels.

3. An automobile comprising a body, a pair of transversely arranged leaf springs secured to the body in superposed relation, a wheel knuckle including a spindle, a wheel on said spindle, universal joints connecting the ends of said springs to said wheel knuckle, said springs being symmetrically arranged with respect to the axis of said wheel and the centers of oscillation of said universal joints lying in line with the axis of rotation of said wheel to minimize shimmying.

4. A running gear assembly comprising a pair of superposed transversely arranged springs, a wheel knuckle including a substantially vertical part swiveled at its ends to said springs and a wheel spindle extending outwardly from said vertical part, a drum carried by said knuckle on one side of said vertical part and enclosing the latter and a disc mounted on the other side of said vertical part and closing the open end of the drum.

5. A running gear assembly comprising a pair of superposed transversely arranged springs, a wheel knuckle including a substantially vertical part swivelled to said springs and a wheel spindle extending outwardly from said vertical part, a wheel on said spindle, a drum carried by said wheel and enclosing the vertical part of said knuckle and a disc mounted on the other side of said vertical part and closing the open end of the drum.

6. In the combination as defined in claim 5, said disc being apertured for the passage of the ends of said springs and flexible sleeves engaging said springs and apertures to prevent the entrance of dust.

7. A running gear assembly comprising a pair of superposed transversely arranged springs, a wheel knuckle including a substantially vertical part swivelled at its ends to said springs and having a socket, a spindle having one end fitted in said socket and having a part projecting therethrough, a steering arm fitted over said part, clamping means on said part for securing said spindle and arm to said vertical part, a drum mounted on said knuckle and enclosing said vertical part and a disc held in place by said clamping means and closing the open end of said drum, said disc being apertured for the passage of the ends of said springs.

8. In the combination as defined in claim 4, driving means arranged within the drum and a shaft for operating said driving means passing outwardly through said disc.

9. A vehicle comprising in combination a body or frame, pairs of spaced substantially parallel springs secured to the body or frame at the front and the rear thereof respectively, a pair of wheels swivelled at the ends of the rear pair of springs, said swivelled connections permitting relative rotation of the wheels and springs in both vertical and horizontal planes, means for holding said rear wheels against swiveling movement in horizontal planes, and means for steering said front wheels.

10. In vehicle running gear the combination of a wheel assembly including a fixed supporting ball, a leaf spring, a socket receiving the ball, a housing surrounding the socket, and means for clamping the housing and the socket to the spring.

11. In vehicle running gear the combination of a wheel assembly including a fixed supporting ball, a leaf spring, a socket receiving the ball, and a housing clamped to the spring, said housing engaging the ball to hold it in the socket and engaging the socket to clamp it to the spring.

12. In vehicle running gear the combination of a wheel assembly including a fixed supporting ball, a leaf spring, a socket receiving the ball, a housing for the socket and means for clamping the housing to the spring, said last named means including a member passing through the spring, said spring being apertured for the reception of said member at a point adjacent the end thereof remote from the load carrying portion so as to leave the full cross section of the spring available for supporting the load.

13. In vehicle running gear the combination of a wheel assembly including a fixed supporting ball, a leaf spring, a socket receiving the ball, a housing for the socket and means for rigidly securing the housing to the ball, the load supporting portion of said spring being imperforate so as to leave the full cross section of the spring available for the supporting of the load.

14. In vehicle running gear the combination of a wheel assembly including a fixed supporting ball, a leaf spring, a socket receiving the ball, a housing surrounding the socket and ball, means for clamping the housing to the spring including a clamping bar overlying the end of the spring, clamping bolts securing the housing to the ends of the bar, and means engaging the housing and bar beyond said load supporting and for rigidly holding the housing and spring in aligned relation.

15. In vehicle running gear the combination of a stub axle comprising vertically spaced upwardly projecting fixed supporting balls, a socket receiving and overlying each of said balls, vertically spaced load supporting springs, and means for rigidly mounting the sockets on the ends of said springs.

16. In vehicle running gear the combination of a pair of vertically spaced transversely extending leaf springs, stub axles at the ends of the springs provided adjacent the ends of the springs with fixed supporting balls, sockets receiving and overlying each of said balls, and means for clamping sockets to the ends of the corresponding springs.

In testimony whereof I affix my signature.

PERRY L. TENNEY.